United States Patent [19]

Bernhard et al.

[11] Patent Number: 4,936,518
[45] Date of Patent: Jun. 26, 1990

[54] APPARATUS FOR CRUSHING OR GRINDING OF FIBROUS MATERIAL, IN PARTICULAR DRUM REFINER

[75] Inventors: Emmerich Bernhard; Johann Lileg; Johannes Kappel; Dag Bergloff, all of Graz, Austria; Sven-Erik Henriksson, North Vancouver, Canada

[73] Assignee: Maschinenfabrik Andritz Aktien Gesellschaft, Austria

[21] Appl. No.: 267,605

[22] Filed: Nov. 7, 1988

[30] Foreign Application Priority Data

Nov. 5, 1987 [AT] Austria .................................. 292587

[51] Int. Cl.⁵ .............................................. B02C 19/12
[52] U.S. Cl. .................................... 241/146; 241/244; 241/259.1; 241/261.1
[58] Field of Search .................. 241/259.1, 244, 259.2, 241/261.1, 261.2, 261.3, 135, 146

[56] References Cited

U.S. PATENT DOCUMENTS 4,401,280 8/1983 Reinhall ...................... 241/261.1 X
4,754,935 7/1988 Gullichsen .................. 241/261.1 X

FOREIGN PATENT DOCUMENTS 2323442 11/1973 Fed. Rep. of Germany .
2289670 5/1976 France .
2083375 3/1982 United Kingdom ................ 241/244

Primary Examiner—Mark Rosenbaum
Attorney, Agent, or Firm—Panitch Schwarze Jacobs & Nadel

[57] ABSTRACT

The invention relates to an apparatus for the crushing or grindign of fibrous material, in particular fibrous material wet or mixed with water, preferably chips, in particular to drum refiners.

The invention is mainly characterized in that channels for the discharge of steam are provided spaced from at least one material feed extending radially to the rotor axis or tangentially to the rotor jacket or housing shell on the grinding surfaces and optionally on the jacket supporting them, the channels piercing the grinding surfaces and optionally their supports and being provided in the working area of the grinding element provided on the surfaces, conveniently surfaces of revolution, in particular frustoconical surfaces, inclined to a rotor axis or extending normally thereto, and emptying into channels optionally provided in the bottoms of the supports and extending normally to the channels and conveniently being connected to cavities in the housing.

48 Claims, 5 Drawing Sheets

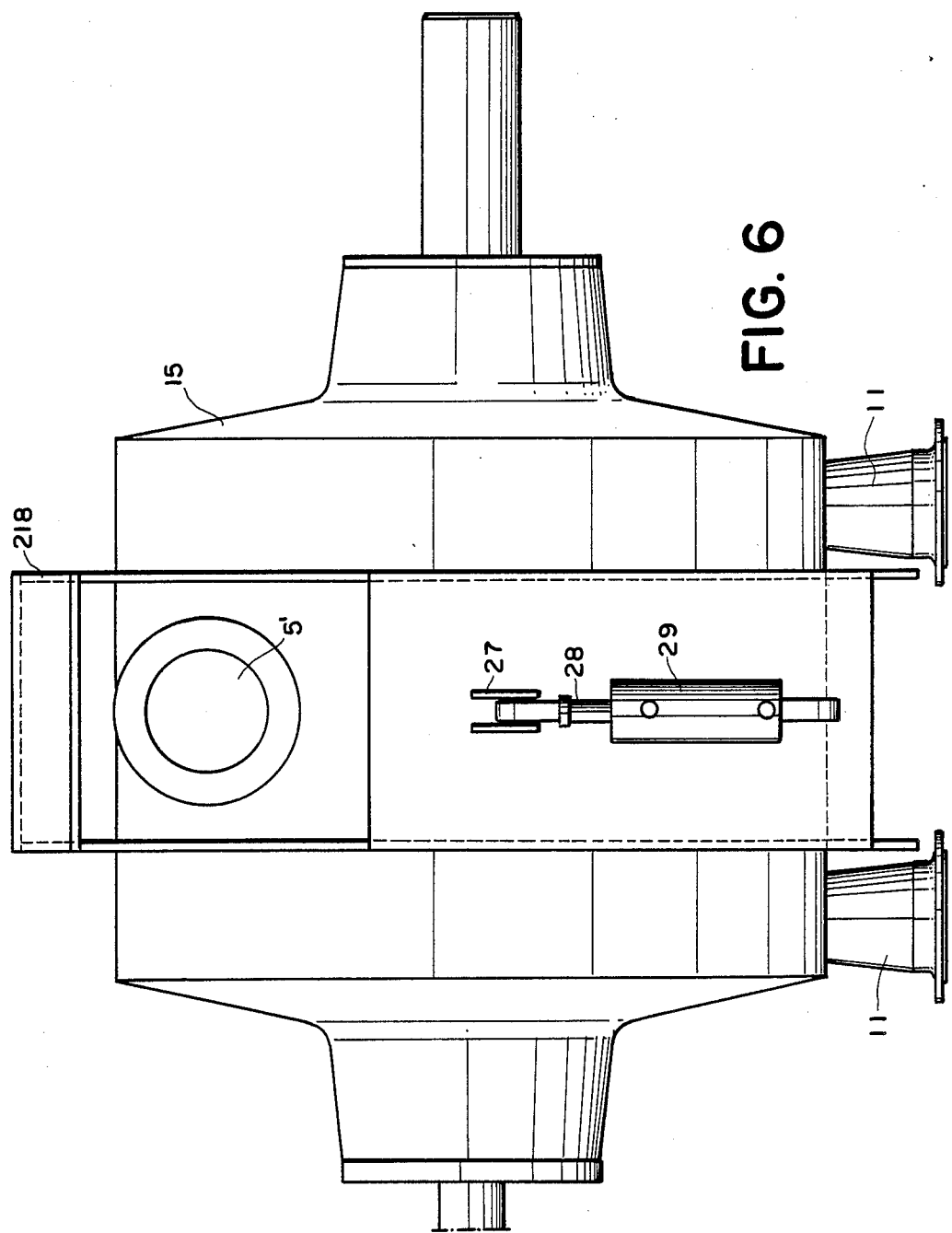

APPARATUS FOR CRUSHING OR GRINDING OF FIBROUS MATERIAL, IN PARTICULAR DRUM REFINER

The invention relates to an apparatus for the crushing or grinding of fibrous material, in particular fibrous material wet or mixed with water, preferably chips, in particular to drum refiners, with an engine-driven rotor having a preferably horizontal rotary shaft and at least one, in particular at least two, surface(s), conveniently surfaces of revolution, in particular frustoconical surface(s) inclined to the rotor axis or extending approximately normally thereto and provided with crushing or grinding elements or grinding plates, with diameters increasing away from the at least one material feed advantageously directed approximately radially to the rotor axis or approximately tangentially to the rotor jacket or housing shell, as well as optionally, if at least two surfaces, in particular surfaces of revolution inclined to the rotor axis or extending approximately normally thereto and having comminuting elements or the like are provided, those with opposing inclination to the rotor axis and a housing receiving the rotor having corresponding inner wall(s) and opposing crushing or grinding elements or grinding plates arranged thereon, the grinding gaps inclined to the rotor axis advantageously being at least partially variable or adjustable between crushing or grinding elements or grinding plates or the like of the rotor jacket conveniently having surfaces of revolution in particular frustoconical surfaces, and corresponding opposing crushing or grinding elements or grinding plates or the like of the inner housing walls.

Refiners of various types are used for the production of wood pulps, for instance CTMP (chemical thermomechanical pulp), TMP (thermomechanical pulp) and RMP. The high mechanical energy applied causes the generation of high frictional forces in the grinding gap in the known refiners and the defibration of the wood. Large amounts of steam are generated and have to be discharged in the or counter to the direction of flow of the grinding stock.

This steam discharge has two disadvantages: the backflowing steam impedes the feeding of the chips to the refiner because of its large volume, which limits the throughput of the refiner. The pressure in the refiner housing is not freely selectable in order to discharge as much steam as possible in the flowing direction of the grinding stock. For a good utilization of the steam, however, the highest possible pressure is of advantage.

Efforts have therefore been made towards an advantageous discharge of the steam. It is known with two-disk refiners to discharge the steam at the start of the grinding gap. The disadvantage of this embodiment resides in the fact that the steam is not directly separated from the fibrous material in the area in which the main volume of the steam is generated, for the pressure in the actual grinding zone of the refiner is essentially higher than the pressure at the inlet of the chips. In the known method mentioned above, only steam of low tension is present. Since the outlet openings for the steam are slightly inclined towards the center of the axis, in order to separate the steam from the solids, pressure is lost on letting off steam in overcoming the centrifugal forces. As a result, the backflow of steam against the feeding of the chips or the like can only be effectively reduced if the steam is discharged at a very low pressure level, which makes the sensible utilization of the energy content essentially more difficult.

It is the object of the invention to discharge the steam generated during the grinding operation directly from the area of the grinding zone in which steam development is highest and the pressure is also highest. This is achieved according to the invention in an apparatus of the type initially described by providing channels or bores for the discharge of steam spaced from the at least one material feed extending in particular approximately radially to the rotor axis or approximately tangentially to the rotor jacket or housing shell on the crushing or grinding surfaces or grinding plates or the like and optionally on the jacket of the rotor carrying them, said channels or bores piercing the crushing or grinding surfaces or grinding plates or the like and optionally their supports and being provided in the working area of the crushing or grinding elements or grinding plates or the like provided on the surfaces, conveniently surfaces of revolution, in particular frustoconical surfaces, inclined to the rotor axis or extending approximately normally thereto, on the one hand, and emptying into channels or bores optionally provided in the bottom of said supports and extending approximately normally to said channels or bores, on the other hand, and conveniently being connected to cavities in the housing. This means that channels or bores lead away in the grinding zone from the site where most steam is generated and where the highest steam pressure prevails; it is particularly convenient if channels or bores extending approximately normally to the rotor axis pierce the crushing or grinding surfaces or grinding plates or the like and their support and empty into channels or bores extending approximately normally thereto provided in the bottom of said supports. This brings about a particularly effective discharge of the steam in refiners provided with an engine-driven rotor; the movement of material along the grinding surfaces or the like and the discharge of the steam in the direction of the housing cavities takes place in the same direction; this is enhanced by the rotating movement of the rotor, on the one hand, and by the conical working surfaces or the like widening towards the housing cavities, on the other hand, and the steam discharge channels emptying there as a result of the generated centrifugal forces. According to the embodiment known from DE-AS 23 23 442, the centrifugal forces in the grinding zone act counter to the material flow, this apparatus, by the way, being a disk mill in which the problems are of an entirely different nature. Particularly striking effects in steam discharge can be achieved if the rotor jacket and the corresponding inner housing wall(s) are conveniently formed as surfaces of revolution, in particular as frustoconical surface(s), with a diameter increasing away from the at least one material feed, if the material feed advantageously extends approximately radially to the rotor axis or approximately tangentially to the rotor jacket or housing shell is provided approximately in the center of said housing and the crushing or grinding surfaces or grinding plates or the like extend on the jacket of a drumshaped rotor and correspondingly on the inner housing well in particular symmetrically, to both sides away from the material feed on the inclined surface, conveniently a surface of revolution, in particular frustoconical surface, with a diameter increasing away from the material feed, the latter enclosing an angle with the rotor axis open to both sides of the front faces of the rotor and crushing or grinding surfaces or grinding plates or the like extending approximately parallel to the rotor axis and in particular directly connected thereto are conveniently provided between the material feed and said crushing or grinding surfaces or grinding plates or the like with increasing diameter, and if the channels or bores pierce the grinding surfaces or grinding plates and optionally the rotor jacket carrying them within the area of the widening surfaces, conveniently surfaces of revolution, in particular frustoconical surfaces, namely, that said channels or bores extend, for instance, in or near the center from the grinding surface to its supports by piercing the grinding plates or the like and emptying into channels or bores in the bottom of the grinding plates or the like or in or at their support(s), said channels or bores being connected to cavities in the housing of the apparatus or refiner. A convenient practical embodiment according to the invention can be so arranged that the crushing or grinding surfaces or grinding plates or the like forming the grinding gaps extending parallel to the axis or extending approximately normally to the axis are arranged symmetrically to the median plane(s) of the, conveniently two or more, radial or tangential material feed(s) advantageously evenly distributed over the circumference of the rotor and steam discharge channels or bores pierce the grinding surfaces or grinding plates or the like or the rotor jacket carrying them transversely to the rotor axis for instance in the area of more than two thirds to three quarters of the path of the grinding stock between the grinding surfaces or grinding plates or the like measured from the entry between said surfaces or plates to its exit into the housing cavities. A particularly effective practical embodiment is obtained if the crushing or grinding surfaces or grinding plates or the like parallel to the axis are followed by the, in particular frustoconical, crushing or grinding surfaces or grinding plates or the like, inclined at an angle of approximately 5 to 45 degrees, in particular 15 degrees, to the rotor axis and for instance the steam discharge channels or bores emptying into the inner grinding surfaces or grinding plates or the like and extending approximately normally to the rotor axis are located approximately in or near the center of said inclined surfaces and in corresponding places of the rotor jacket carrying them. A regulation of the grinding gaps and thus above all a control of the pulp quality and under certain circumstances of the steam control and steam supply may also prove advantageous. This may be achieved according to the invention by providing for the crushing or grinding surfaces or grinding plates or the like to be attached to at least one, conveniently two, supports displaceable or adjustable in the housing, in particular for the outer opposing crushing or grinding surfaces or grinding plates located opposite the mouths of the steam discharge channels or bores in the working area, to be attached to at least one stator ring, in particular to at least two stator rings which are preferably displaceable independently of one another.

The invention is advantageously applicable if an annular material feed gap connected to an annular space enclosing the outside of the rotor within the housing, into which space the approximately tangential or approximately radial material feed(s) empty, is provided approximately in the cross-axial median plane of the apparatus or its housing between the crushing or grinding surfaces parallel to the axis and thus between those inclined to the rotor axis and provided with steam outlets. For discharging the steam, it is convenient if cavities are provided in the area of the two front walls of the housing in the vicinity of the shaft bearings provided on both sides of the rotor having crushing or grinding surfaces parallel and inclined to the axis and optionally extending approximately normally to the axis, into which cavities the in particular conical or normally extending crushing or grinding gaps and their steam discharge channels or bores empty, said cavities being sealed steam-tight against the two bearings by the special sealing units inserted in the bearing housing between rotor and bearings on the rotor side and conveniently being provided with discharge openings for the comminuted material. A considerable saving in energy can be achieved in the operation of the apparatus according to the invention if the drumshaped rotor provided on its jacket with crushing or grinding surfaces extending approximately parallel to its axis and on both sides adjacent crushing or grinding surfaces with diameters increasing away from the material feed and connected to steam discharges or provided therewith and optionally with crushing or grinding surfaces extending approximately normally to the rotor axis is supported in sliding bearings by means of the rotary shaft fixedly attached to it and a special starting engine, in particular a direct current engine, is provided for the starting operation and the main engine is designed for an operation at about 3,000 up to 3,600 rpm at full load.

The invention is particularly useful in drum refiners or the like with horizontal rotary axis. But under certain circumstances, it can also be applied advantageously if the rotary axis of the rotor extends vertically.

BRIEF DESCRIPTION OF THE DRAWINGS

The foregoing summary, as well as the following detailed description is better understood when read in conjunction with the appended drawings. For the purpose of illustrating the invention, embodiments which are presently preferred are shown in the drawings. It is understood, however, that this invention is not limited to the precise arrangements and instrumentalities shown. In the drawings:

FIG. 6 is a front elevational view of the apparatus for crushing and grinding material shown in FIG. 4.

Figure 1:
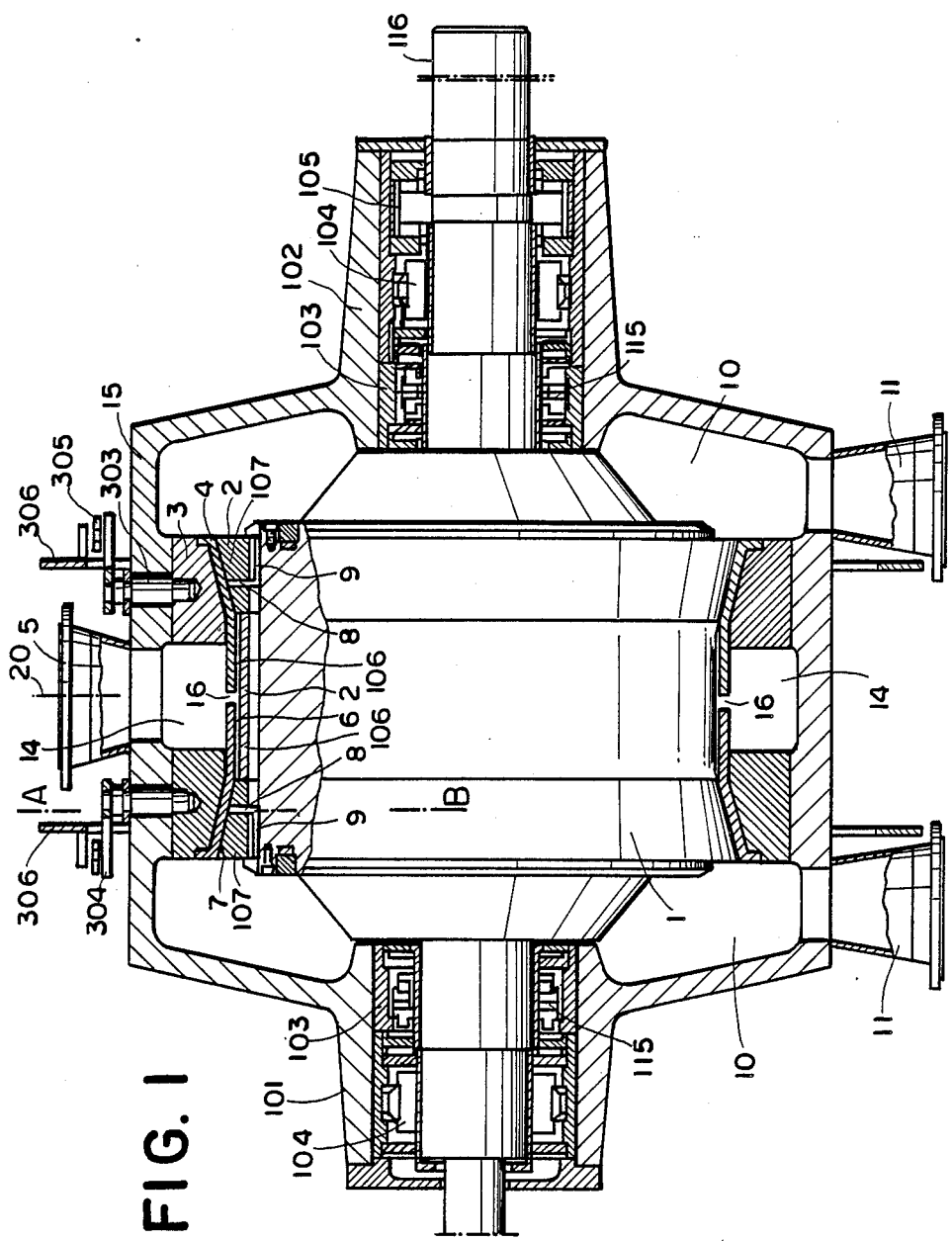
FIG. 1 is a front elevational view, partially in cross section, of an apparatus for crushing or grinding fibrous material in accordance with the present invention.

The drum refiner shown is provided with a cylindrical, bilaterally supported rotor 1 on which grinding plates 2 are attached by means of which the grinding zone at first extends parallel to the axis and is then slightly inclined to the horizontal. Opposing grinding plates 4 are provided on stator rings 3 adjustable in the horizontal direction. The chips are fed to the refiner via conveyor screws in the radially directed material feed(s) 5 of which two or more are evenly distributed over the circumference of the drum refiner; the chips are distributed to both sides in the precrushing zone 6 extending parallel to the axis and are essentially defibrated in the grinding zone 7 inclined to the rotor axis. From said zone 7, channels 8 lead vertically toward the rotor axis to (a) collecting channel(s) 9. Through this channel system, the steam is passed to a cavity 10 of the refiner housing from where it exits together with the fibrous material at 11 and is passed to a pressure cyclone downstream for heat recovery and discharge. Identical or similar channels 8,9 are conveniently also provided on both sides of the rotor. The grinding plates 2 are conveniently composed of segments 2' (FIG. 2). An embodiment of dimensions particularly adapted to practical use is shown in FIG. 3. Anchoring lugs 12 in corresponding rotor grooves 13 of hammerhead-like cross section are provided for the individual grinding plate segments 2'. The corresponding remaining components of this representation are provided with the same reference numbers as those used in FIGS. 1 and 2.

The advantage of the invention resides in the fact that the steam is discharged directly at the site of its generation and thus at the highest possible pressure. A backflow of steam and thus an impediment of the feeding of chips or the like is largely prevented thereby. By the channels 8 extending normally to the rotor axis, a good discharge of steam and optionally its separation from the solids is obtained and a clogging of the channels is prevented. The good discharge of the steam not only permits a recovery of the steam at the highest possible pressure, but also—in relation to the available grinding surface—a higher specific use of energy.

Figure 3:
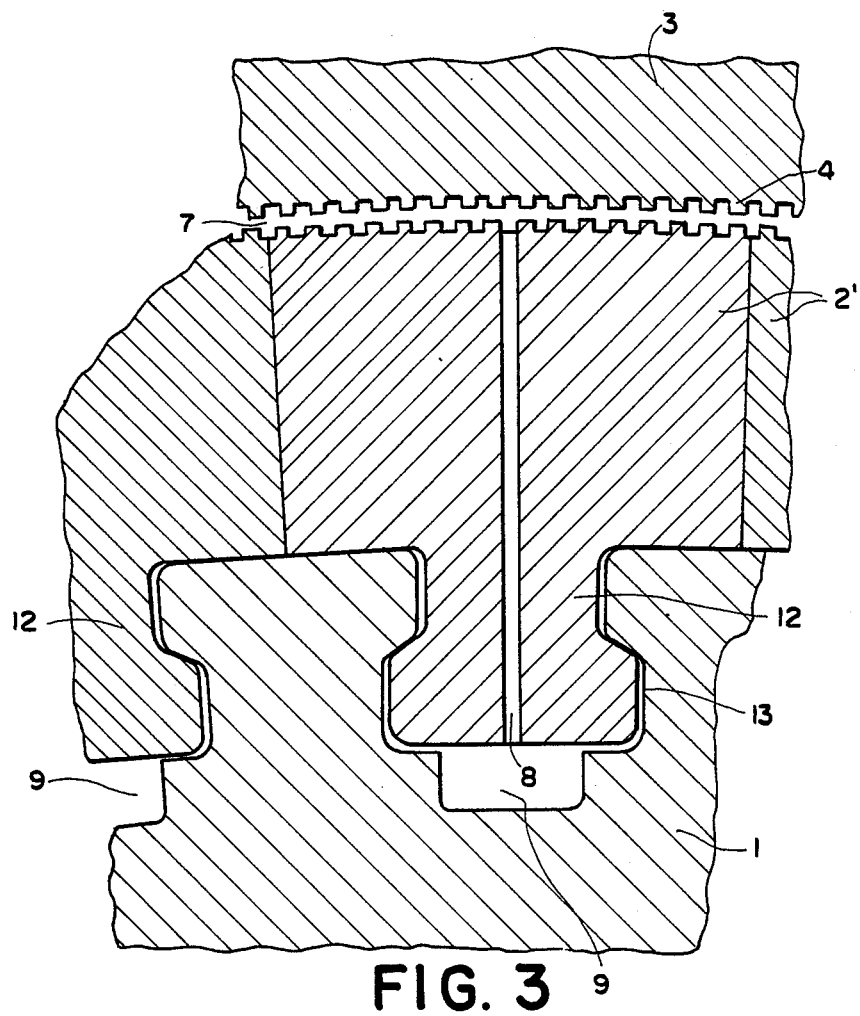
FIG. 3 is a greatly enlarged view of the portion of the apparatus for grinding and crushing material shown in FIG. 2.
Figure 4:
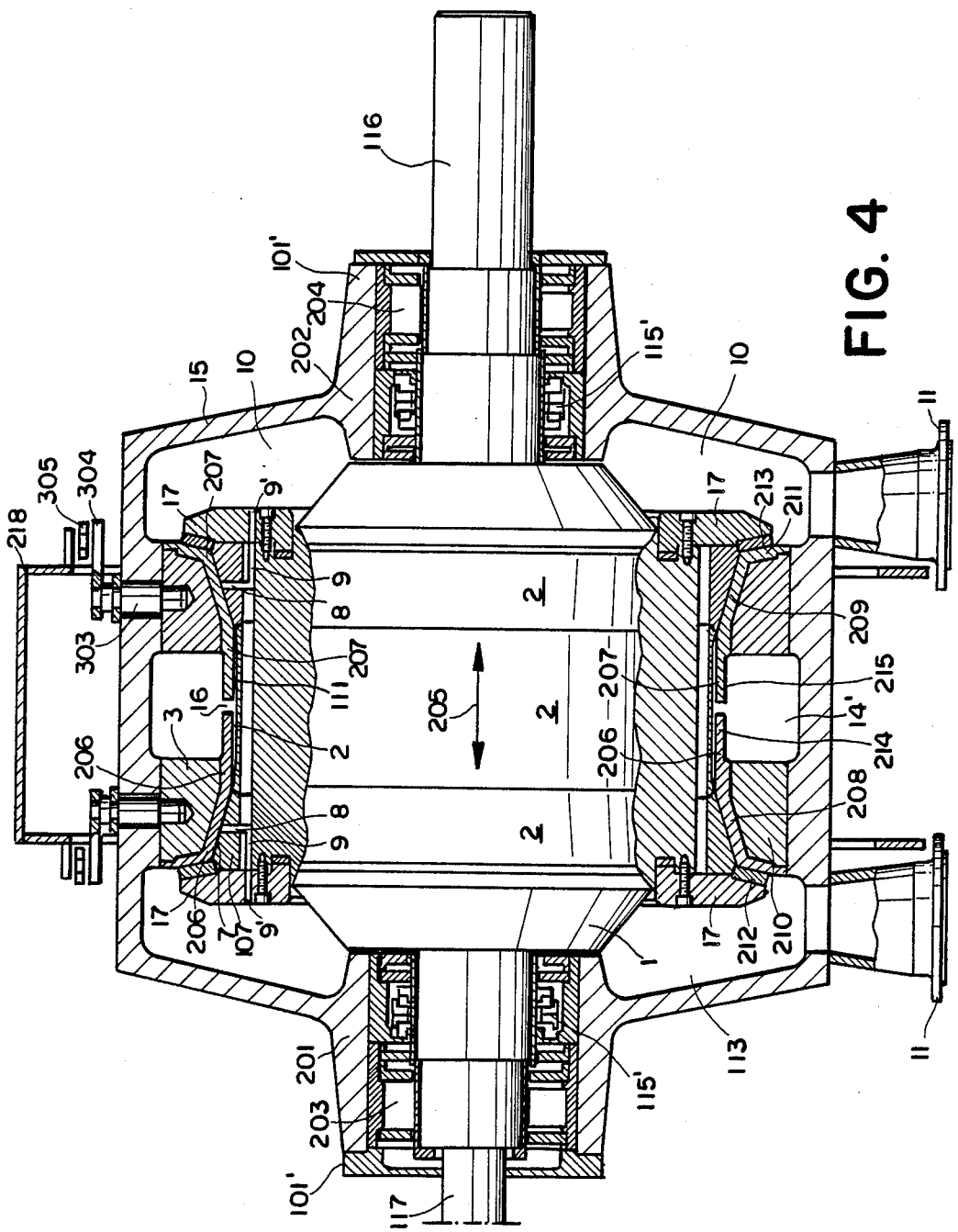
FIG. 4 is a front elevational view, partially in cross section, of an apparatus for crushing and grinding material in accordance with an alternate embodiment of the invention.
Figure 5:
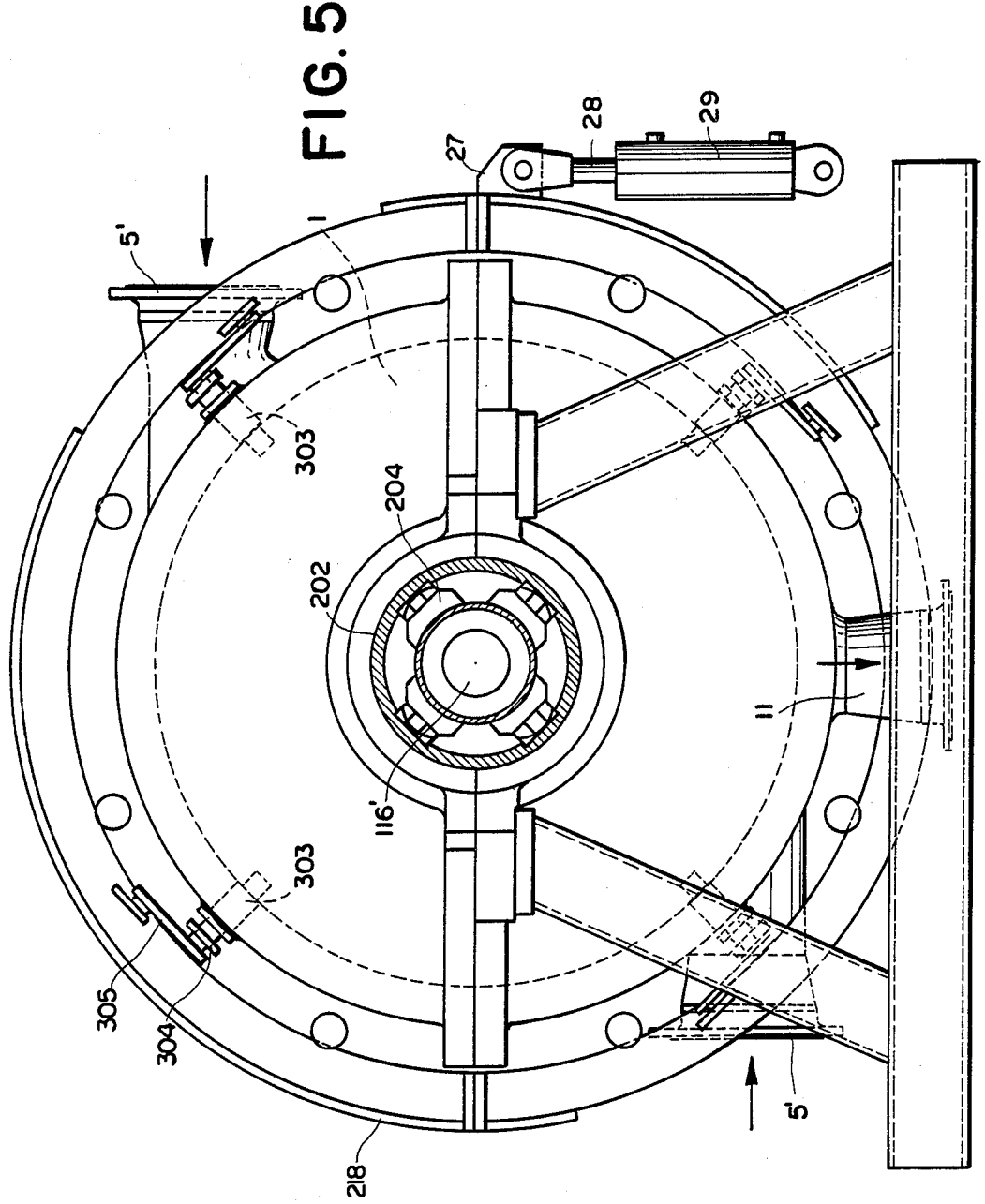
FIG. 5 is a side elevational view, in partial cross section, of the apparatus for crushing and grinding material shown in FIG. 4.

The variant according to FIGS. 4 to 6 shows, as briefly mentioned before, an apparatus with material feeds 5' extending approximately tangentially to the rotor 1 (FIGS. 5, 6). In the representations of FIGS. 4 to 6, identical components or parts of the apparatus corresponding to the variants according to FIGS. 1 to 3 are provided with identical reference numbers.

Figure 2:
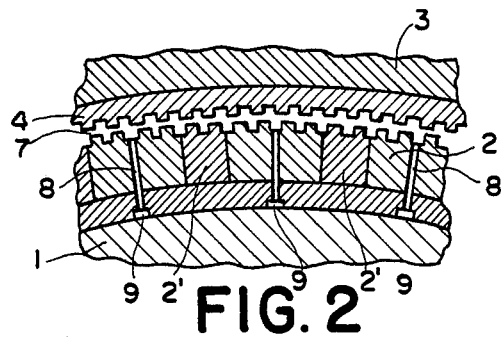
FIG. 2 is an enlarged cross-sectional view, schematically showing a portion of the apparatus for grinding or crushing material of FIG. 1 taken along lines A—B of FIG. 1.

In the embodiment according to FIGS. 1 to 3 as well as in that according to FIGS. 4 to 6, the material to be comminuted is conveyed from the radial or tangential material feeds 5 or 5' into an annular space 14 or 14' enclosing the outside of the rotor 1 within the housing 15 of the apparatus. This annular space 14 is connected on the inside to an annular material feed gap 16 provided in the cross-axial median plane of the apparatus or its housing between the crushing or grinding zones 6 parallel to the axis and thus between the crushing or grinding zones 7 inclined to the rotor axis.

The steam discharges 8,9 are formed in the variant according to FIGS. 4 to 6 similarly to FIGS. 1 to 3, although the collecting channels 9 are made to pass by means of extension channels 9' through supporting rings 17 connected to the rotor 1, which rings 17 carry grinding plates 212, 213 at an angle of nearly 90 degrees with the rotor axis. Said grinding plates 212, 213 cooperate with opposing grinding plate extensions 210, 211 attached to the stator rings 3 and forming approximately identical angles with the rotor axis as the grinding plates 212, 213.

The apparatus previously described are of similar construction as far as the remaining components are concerned: in the preferably horizontally divided refiner housing 15, the cylindrical rotor 1 is bilaterally supported in bearings 101, 102 or 101', rolling bearings, sliding bearings or sliding bearings with tilting segments being used depending on diameter, capacity and number of revolutions per minute. In the representation of FIG. 1, the rotor shaft ends are secured against axial displacement and supported in the bearing parts 103, 104 or 105 of the bearings 101, 102. In the embodiment according to FIGS. 4 to 6, a floating support described in detail later on is provided. On the rotor 1, grinding plates 106 are attached in zone 6 and grinding plates 107 are attached in zone 7, the grinding plates 106 arranged along a cylindrical part of the jacket serving for precrushing of the chips and the grinding plates 107 forming an angle with the rotor axis serving for defibration. By the shape of the grinding plates 107, an inclination of the grinding zone to the horizontal of between 5 and 45 degrees, preferably 15 degrees, is achieved. The additional grinding plates of steeper inclination to the rotor axis shown in FIG. 4 will be described later on.

The axially displaceable stator rings 3 provided with the opposing grinding plates 4 are radially engaged by a plurality of eccentric bolts 303 distributed over the circumference and exactly fixing the stator ring 3 in the desired position axially as well as radially. The stator ring(s) 3 thus do(es) not have to be guided on the outer jacket and can have movement in respect of the housing 15.

In order to adjust the grinding gap, the eccentric bolt 33 can be rotated via a lever 304 positively attached thereon and a guide bar 305 connected thereto, whereby, as shown in FIG. 1, all the guide bars of a stator ring are exactly and uniformly adjusted by a control ring 306 hydraulically or mechanically actuated for instance by means of the adjusting mechanism. A simultaneous adjustment, of both stator rings is described later on under reference to FIGS. 4 to 6.

The control rings 306 are—adapted to the housing—preferably composed of two parts and carried by suitable roll bodies connected to the housing. The arrangement of the control rings 306 is concentric to the stator ring 3 and preferably above the pivoting range of the levers 304.

As a result of the symmetrical arrangement of the stator rings 3, the adjusting means is also arranged symmetrically to the median line 20; the two control rings 306 are adjustable independently of one another in order to compensate for differences in the dimension of the grinding gap on both sides, for instance as the result of uneven thermal expansion of housing and rotor.

In the embodiment according to FIGS. 1 to 3, the chips are fed radially via one to four material feed(s) 5 with openings on the circumference. As mentioned previously, the chips are precrushed in the horizontal grinding zone 6 and distributed symmetrically in both directions. The defibration of the wood is effected in the grinding zone 7 inclined to the horizontal. The grinding stock is conveyed from there to the inner space 10 of the refiner housing and is discharged at 11 together with the generated steam.

The bearing are sealed against the steam in the refiner housing by means of sealing units 115. On the free shaft end 116, an engine, preferably a direct current engine, of essentially lower output than the main engine, can be installed in order to reduce the starting current peak. By this embodiment modified in comparison to known refiners, the refiner according to the invention can be operated at 3,000 to 3,600 rpm.

The invention can also be used advantageously in refiners with vertically extending rotor shaft. The comminuting of fibrous materials other than wood and under certain circumstances even of leather scraps is possible, water or other liquids optionally being added to the precrushed material. The following effects and advantages in refiners or the like can be achieved: A guidance and centering of the outer grinding plate support(s) in the form of (a) stator ring(s) by means of radial eccentric bolts distributed over the circumference and a controlled axial displacement of the stator ring(s) by means of eccentric bolts, lever, guide bars and control ring(s). An additional advantage is a concentric arrangement of the control ring(s) in relation to the stator ring(s), said control rings enclosing the housing. In this case, a symmetrical embodiment of the adjusting means for the two stator rings is of great advantage. The adjustment of one control ring causes the uniform rotation of all the eccentric bolts connected to the same control ring and thus an exact axial displacement of the associated stator ring without jamming or the like occurring. This brings about a favorable power-distance-transmission. Due to the separate control rings for the individual stator rings, a particular control of the grinding gap, its shape and dimension is possible. Complicated hydraulic adjusting devices are thus avoided.

The embodiment according to FIGS. 4 to 6 differs from the one previously described mainly by the type of material feed, the special support of the rotor and the modified stator adjustment.

The material feed takes place only at 5' in this case in two places approximately tangentially to the rotor 1 into the annular space 14' from which the material is conveyed to the grinding plates or the like. The shaft ends 116, 117 of the rotor 1 and thus the rotor itself are supported floatingly in this case. For this purpose, hydrostatic sliding bearings 203 and 204 are provided in the bearings 201 and 202. The bearings are again sealed against the steam in the refiner housing by means of sealing units 115'. The double arrow 205 indicates the possible rotor movement and floating rotor support made possible by the aforementioned support of the rotor. Even if the adjustment of only one stator were sufficient in this case, the adjustment of both stators 3 and thus of the opposing grinding plates or the like 206, 207 attached to them is also possible; these grinding plates or the like, as already mentioned, are provided with parts 210, 211 in addition to the frustoconical parts 208, 209, the parts 210, 211 forming a larger angle, namely one of nearly 90 degrees, with the rotor axis than the parts 208, 209. As mentioned previously, additional grinding plates 212, 213 cooperate with the parts 210, 211 and extend just as steeply to the rotor axis as the parts 210, 211 and are supported by special rings 17 connected to the rotor 1.

The adjustment of the stators 3 and thus of the opposing grinding plates or the like 206 to 211, but also of the cylindrically formed opposing grinding plates 214, 215 is effected in a manner similar to that shown in FIGS. 1 to 3 via the parts 303 to 305, although in this case simultaneously and in opposing direction via curved hoops 218 which are uniformly displaced by means the adjusting mechanisms 27 to 29. In view of the floatingly supported rotor, the adjustment of only one stator would be conceivable in this case. The second stator would then be rigidly supported in the housing. The mobility for the grinding gap adjustment is assured by the free axial displaceability (floating support) of the rotor.

We claim:

1. In an apparatus for crushing or grinding fibrous material comprising an engine-driven rotor having a generally horizontal rotor axis, at least one material feed extending generally radially to the rotor axis, a rotor jacket positioned on said rotor and having two spaced apart rotation surfaces inclined at an angle to the rotor axis such that the two rotation surfaces of the rotor jacket increase in diameter in the direction away from said material feed, said rotation surfaces being provided with first grinding surfaces, a housing for receiving the rotor and rotor jacket therein and having inner walls correspondingly inclined to the rotation surfaces of the rotor jacket with opposing second grinding surfaces arranged thereon such that grinding gaps are formed between said first grinding surfaces of said rotor jacket and said second grinding surfaces of said housing, said material feed being generally centrally disposed on said housing between said rotation surfaces for feeding material therebetween, and a pair of cavities positioned between said rotor and said housing for receiving crushed or ground material, the improvement comprising third grinding surfaces extending generally parallel to the rotor axis and positioned on the rotor jacket between said rotation surfaces, opposing fourth grinding surfaces correspondingly positioned on said housing, said third and fourth grinding surfaces being interposed between said material feed and the rotation surfaces, said generally parallel third and fourth grinding surfaces being positioned adjacent said rotation surfaces such that said fibrous material passes directly from said material feed to said generally parallel third and fourth grinding surfaces, and to said first and second grinding surfaces, said rotation surfaces including first channels extending between said grinding gaps and second channels, said second channels being provided in said rotor jacket for allowing fluid to pass therethrough, said first and second channels being spaced from said material feed and being in fluid communication with said cavities.

2. The apparatus as recited in claim 1, wherein said third and fourth grinding surfaces form grinding gaps extending generally parallel to said rotor axis.

3. The apparatus as recited in claim 1, wherein said first channels pierce said rotor jacket inclined rotation surfaces near the center of said inclined rotation surfaces.

4. The apparatus as recited in claim 1, wherein said first channels pierce said inclined rotation surfaces transversely to the rotor axis at a position in the range of about ⅜ to ¾ of the path of the grinding gaps measured from the material feed to the cavities.

5. The apparatus as recited in claim 1, wherein said first channels extend generally normal to said rotor axis and said second channels extend parallel to said rotor axis.

6. The apparatus as recited in claim 1, wherein said inclined rotation surfaces are positioned at an angle of approximately 5° to 45° with respect to the rotor axis.

7. The apparatus as recited in claim 1, wherein the rotor jacket further includes a second pair of inclined rotation surfaces positioned outwardly and adjacent to the inclined rotation surfaces positioned adjacent the generally parallel grinding surfaces, said second pair of inclined rotation surfaces being inclined at an angle which is larger than the angle of said first pair of inclined rotation surfaces, with respect to said rotor axis.

8. The apparatus as recited in claim 7, wherein the angle of said second pair of inclined rotation surfaces is approximately 30°.

9. The apparatus as recited in claim 1, wherein the second grinding surfaces are attached to at least one adjustable stator for adjusting the width of the grinding gaps.

10. The apparatus as recited in claim 9, wherein said second grinding surfaces are attached to at least two stator rings which are adjustable independently of each other.

11. The apparatus as recited in claim 9, wherein the rotor is floatingly supported in bearings at both ends of said housing.

12. The apparatus as recited in claim 9, wherein said rotor is supported at both ends in hydrostatic sliding bearings within which said rotor is axially displaceable, and a ceiling unit encloses the rotor between said sliding bearings and said rotor jacket.

13. The apparatus as recited in claim 9, wherein said first channels are located opposite to said at least one adjustable stator.

14. The apparatus as recited in claim 1, wherein said material feed includes an annular space surrounding the rotor jacket within said housing at approximately the cross-axial median plane of the apparatus, and said material is fed to the third and fourth grinding surfaces through a feed gap leading from said annular space to said third and fourth grinding surfaces.

15. The apparatus as recited in claim 1, wherein said cavities are provided in the area of the housing adjacent to shaft bearings provided at both ends of the rotor, said bearings being provided with seals against steam, and said cavities being provided with discharge openings for the crushed or ground material.

16. The apparatus as recited in claim 1, wherein said rotor is connected to a main engine adapted for operation at approximately 3,000 to 3,600 rpm's at full load, and a starting engine to assist the main engine in the starting operation.

17. In an apparatus for crushing or grinding wet fibrous material comprising an engine-driven rotor having a generally horizontal rotor axis, at least one material feed extending generally radially to the rotor axis, a rotor jacket positioned on said rotor and having two spaced apart frusto-conical rotation surfaces inclined at an angle to the rotor axis such that the two rotation surfaces of the rotor jacket increase in diameter in the direction away from said material feed, said rotation surfaces being provided with first grinding surfaces, a housing for receiving the rotor and rotor jacket therein and having inner walls correspondingly inclined to the rotation surfaces of the rotor jacket with opposing second grinding surfaces arranged thereon such that grinding gaps are formed between said first grinding surfaces of said rotor jacket and said second grinding surfaces of said housing, said material feed being generally centrally disposed on said housing between said rotation surfaces for feeding material therebetween, and a pair of cavities positioned between said rotor and said housing for receiving crushed or ground material, the improvement comprising third grinding surfaces extending generally parallel to the rotor axis and positioned on the rotor jacket between said rotation surfaces, opposing fourth grinding surfaces correspondingly positioned on said housing, said third and fourth grinding surfaces being interposed between said material feed and the rotation surfaces, said generally parallel third and fourth grinding surfaces being positioned adjacent said rotation surfaces such that said fibrous material passes directly from said material feed to said generally parallel third and fourth grinding surfaces, and to said first and second grinding surfaces, said rotation surfaces including first channels extending between said grinding gaps and second channels, said second channels being provided in said rotor jacket for allowing fluid to pass therethrough, said first and second channels being spaced from said material feed and being in fluid communication with said cavities.

18. The apparatus as recited in claim 17, wherein said third and fourth grinding surfaces form grinding gaps extending generally parallel to said rotor axis.

19. The apparatus as recited in claim 17, wherein said first channels pierce said rotor jacket inclined rotation surfaces near the center of said inclined rotation surfaces.

20. The apparatus as recited in claim 17, wherein said first channels pierce said inclined rotation surfaces transversely to the rotor axis at a position in the range of about ⅔ to ¾ of the path of the grinding gaps measured from the material feed to the cavities.

21. The apparatus as recited in claim 17, wherein said first channels extend generally normal to said rotor axis and said second channels extend parallel to said rotor axis.

22. The apparatus as recited in claim 17, wherein said inclined rotation surfaces are positioned at an angle of approximately 5° to 45° with respect to the rotor axis.

23. The apparatus as recited in claim 17, wherein the rotor jacket further includes a second pair of inclined rotation surfaces positioned outwardly and adjacent to the inclined rotation surfaces positioned adjacent the generally parallel grinding surfaces, said second pair of inclined rotation surfaces being inclined at an angle which is larger than the angle of said first pair of inclined rotation surfaces, with respect to said rotor axis.

24. The apparatus as recited in claim 23, wherein the angle of said third pair of rotation surfaces is approximately 30°.

25. The apparatus as recited in claim 17, wherein the second grinding surfaces are attached to at least one adjustable stator for adjusting the width of the grinding gaps.

26. The apparatus as recited in claim 25, wherein said second grinding surfaces are attached to at least two stator rings which are adjustable independently of each other.

27. The apparatus as recited in claim 25, wherein the rotor is floatingly supported in bearings at both ends of said housing.

28. The apparatus as recited in claim 25, wherein said rotor is supported at both ends in hydrostatic sliding bearings within which said rotor is axially displaceable, and a ceiling unit encloses the rotor between said sliding bearings and said rotor jacket.

29. The apparatus as recited in claim 25, wherein said first channels are located opposite to said at least one adjustable stator.

30. The apparatus as recited in claim 17, wherein said material feed includes an annular space surrounding the rotor jacket within said housing at approximately the cross-axial median plane of the apparatus, and said material is fed to the third and fourth grinding surfaces through a feed gap leading from said annular space to said third and fourth grinding surfaces.

31. The apparatus as recited in claim 17, wherein said cavities are provided in the area of the housing adjacent to shaft bearings provided at both ends of the rotor, said bearings being provided with seals against steam, and said cavities being provided with discharge openings for the crushed or ground material.

32. The apparatus as recited in claim 17, wherein said rotor is connected to a main engine adapted for operation at approximately 3,000 to 3,600 rpm's at full load, and a starting engine to assist the main engine in the starting operation.

33. In an apparatus for crushing or grinding fibrous material comprising an engine-driven rotor having a generally horizontal rotor axis, a housing for receiving the rotor therein, at least one material feed positioned on said housing, a rotor jacket positioned on said rotor and having two spaced apart rotation surfaces inclined at an angle to the rotor axis such that the two rotation surfaces of the rotor jacket increase in diameter in the direction away from said material feed, said rotation surfaces being provided with first grinding surfaces, said housing having inner walls correspondingly inclined to the rotation surfaces of the rotor jacket with opposing second grinding surfaces arranged thereon such that grinding gaps are formed between said first grinding surfaces of said rotor jacket and said second grinding surfaces of said housing, said material feed being generally centrally disposed on said housing between said rotation surfaces for feeding material therebetween, said material feed extending generally tangentially from said housing, and a pair of cavities positioned between said rotor and said housing for receiving crushed or ground material, the improvement comprising third grinding surfaces extending generally parallel to the rotor axis and positioned on the rotor jacket between said rotation surfaces, opposing fourth grinding surfaces correspondingly positioned on said housing, said third and fourth grinding surfaces being interposed between said material feed and the rotation surfaces, said generally parallel third and fourth grinding surfaces being positioned adjacent said rotation surfaces such that said fibrous material passes directly from said material feed to said generally parallel third and fourth grinding surfaces, and to said first and second grinding surfaces, said rotation surfaces including first channels extending between said grinding gaps and second channels, said second channels being provided in said rotor jacket for allowing fluid to pass therethrough, said first and second channels being spaced from said material feed and being in fluid communication with said cavities.

34. The apparatus as recited in claim 33, wherein said third and fourth grinding surfaces form grinding gaps extending generally parallel to said rotor axis.

35. The apparatus as recited in claim 33, wherein said first channels pierce said rotor jacket inclined rotation surfaces near the center of said inclined rotation surfaces.

36. The apparatus as recited in claim 33, wherein said first channels pierce said inclined rotation surfaces transversely to the rotor axis at a position in the range of about ⅜ to ¾ of the path of the grinding gaps measured from the material feed to the cavities.

37. The apparatus as recited in claim 33, wherein said first channels extend generally normal to said rotor axis and said second channels extend parallel to said rotor axis.

38. The apparatus as recited in claim 33, wherein said inclined rotation surfaces are positioned at an angle of approximately 5° to 45° with respect to the rotor axis.

39. The apparatus as recited in claim 33, wherein the rotor jacket further includes a second pair of inclined rotation surfaces positioned outwardly and adjacent to the inclined rotation surfaces positioned adjacent the generally parallel grinding surfaces, said second pair of inclined rotation surfaces being inclined at an angle which is larger than the angle of said first pair of inclined rotation surfaces, with respect to said rotor axis.

40. The apparatus as recited in claim 39, wherein the angle of said second pair of inclined rotation surfaces is approximately 30°.

41. The apparatus as recited in claim 33, wherein the second grinding surfaces are attached to at least one adjustable stator for adjusting the width of the grinding gaps.

42. The apparatus as recited in claim 41, wherein said second grinding surfaces are attached to at least two stator rings which are adjustable independently of each other.

43. The apparatus as recited in claim 41, wherein the rotor is floatingly supported in bearings at both ends of said housing.

44. The apparatus as recited in claim 41, wherein said rotor is supported at both ends in hydrostatic sliding bearings within which said rotor is axially displaceable, and a ceiling unit encloses the rotor between said sliding bearings and said rotor jacket.

45. The apparatus as recited in claim 41, wherein said first channels are located opposite to said at least one adjustable stator.

46. The apparatus as recited in claim 33, wherein said material feed includes an annular space surrounding the rotor jacket within said housing at approximately the cross-axial median plane of the apparatus, and said material is fed to the third and fourth grinding surfaces through a feed gap leading from said annular space to said third and fourth grinding surfaces.

47. The apparatus as recited in claim 33, wherein said cavities are provided in the area of the housing adjacent to shaft bearings provided at both ends of the rotor, said bearings being provided with seals against steam, and said cavities being provided with discharge openings for the crushed or ground material.

48. The apparatus as recited in claim 33, wherein said rotor is connected to a main engine adapted for operation at approximately 3,000 to 3,600 rpm's at full load, and a starting engine to assist the main engine in the starting operation.

* * * * *